(12) United States Patent
Shimizu et al.

(10) Patent No.: US 8,775,007 B2
(45) Date of Patent: Jul. 8, 2014

(54) SHIFT-BY-WIRE SYSTEM

(75) Inventors: Kenji Shimizu, Kariya (JP); Tomoya Iwami, Obu (JP); Katsuki Ishigaki, Handa (JP)

(73) Assignee: Denso Corporation, Kariya (JP)

( * ) Notice: Subject to any disclaimer, the term of this patent is extended or adjusted under 35 U.S.C. 154(b) by 203 days.

(21) Appl. No.: 13/534,893

(22) Filed: Jun. 27, 2012

(65) Prior Publication Data

US 2013/0006486 A1 Jan. 3, 2013

(30) Foreign Application Priority Data

Jun. 28, 2011 (JP) ................................. 2011-143168

(51) Int. Cl.
*G01M 17/00* (2006.01)
*G06F 7/00* (2006.01)
*G06F 11/00* (2006.01)
*G06F 19/00* (2011.01)
*G07C 5/00* (2006.01)

(52) U.S. Cl.
USPC ........... 701/29.1; 701/51; 701/30.3; 701/31.7

(58) Field of Classification Search
USPC ........... 701/51, 62, 63, 29.1, 29.2, 29.7, 30.3, 701/30.5, 31.7–31.9, 33.4, 33.6–34.1
See application file for complete search history.

(56) References Cited

U.S. PATENT DOCUMENTS

| 5,964,813 | A | 10/1999 | Ishii et al. | |
|---|---|---|---|---|
| 6,564,133 | B2 * | 5/2003 | Ebashi | 701/62 |
| 6,615,778 | B2 * | 9/2003 | Iwaki et al. | 123/90.17 |
| 8,311,716 | B2 * | 11/2012 | Hoshino et al. | 701/62 |
| 2002/0020236 | A1 * | 2/2002 | Onodera | 74/335 |
| 2003/0023405 | A1 | 1/2003 | Loehr | |
| 2006/0271260 | A1 | 11/2006 | Matsuzaki et al. | |
| 2008/0040009 | A1 * | 2/2008 | Kamada et al. | 701/51 |
| 2008/0182717 | A1 | 7/2008 | Shinojima et al. | |
| 2010/0312424 | A1 | 12/2010 | Yasui | |

FOREIGN PATENT DOCUMENTS

| JP | 2001-230925 | 8/2001 |
|---|---|---|
| JP | 2002-022004 | 1/2002 |
| JP | 2006-335157 | 12/2006 |
| JP | 2007-32819 | 2/2007 |
| JP | 2011-157856 | 8/2011 |

OTHER PUBLICATIONS

Office Action (1 page) dated Jul. 30, 2013, issued in corresponding Japanese Application No. 2011-143168 and English translation (2 pages).

* cited by examiner

*Primary Examiner* — Rami Khatib
(74) *Attorney, Agent, or Firm* — Nixon & Vanderhye P.C.

(57) ABSTRACT

In a motor ECU, a motor control unit detects an abnormality when a parking mechanism has not attained a target range within a predetermined period after control of the driving of a motor is started. A data memory unit stores diagnosis information when the motor control unit detects an abnormality. An abnormality check unit compares the state of a changeover mechanism outputted by the motor control unit with the target range and stores diagnosis information in the data memory unit, when the state of the parking mechanism has not attained the target range within a predetermined period after the state of the parking mechanism is outputted and when the motor control unit has not detected an abnormality.

4 Claims, 7 Drawing Sheets

FIG. 3A

| FAILURE PART \ ECU | HV ECU (SHIFT CHECK) | MOTOR ECU (MOTOR DRIVE) | TO BE REPLACED |
|---|---|---|---|
| MOTOR ECU | ABNORMAL | NOT DETECTED | MOTOR ECU (DATA STORING BY MOTOR ECU AND HV ECU) |
| MOTOR PARKING MECHANISM | NOT DETECTED | ABNORMAL | MOTOR (DATA STORING BY MOTOR ECU) |

FIG. 3B  COMPARATIVE EXAMPLE

| FAILURE PART \ ECU | HV ECU (SHIFT CHECK) | MOTOR ECU (MOTOR DRIVE) | TO BE REPLACED |
|---|---|---|---|
| MOTOR ECU | ABNORMAL | NOT DETECTED | MOTOR ECU (DATA STORING BY HV ECU) |
| MOTOR PARKING MECHANISM | ABNORMAL | ABNORMAL | MOTOR (DATA STORING BY HV ECU AND MOTOR ECU) |

SHIFT-BY-WIRE SYSTEM

CROSS REFERENCE TO RELATED APPLICATION

This application is based on and incorporates herein by reference Japanese patent application No. 2011-143168 filed on Jun. 28, 2011.

TECHNICAL FIELD

The present disclosure relates to a shift-by-wire system.

BACKGROUND

In a conventional shift-by-wire system for an automatic transmission of a vehicle, driving of a motor is controlled based on a signal representing a target shift range (gear position) corresponding to a range changeover operation (for example, a parking lock operation) of a vehicle driver to thereby change the range to the target range selected by the driver, for example, from a parking range (P-range) to a non-parking range (non-P-range) or from the non-P-range to the P-range. That is, the motor in the shift-by-wire system is rotated to move a changeover mechanism to thereby change the range to the target range selected by the driver. The changeover mechanism is a range changeover mechanism for realizing a changeover to each of the P-range, neutral range (N-range), reverse range (R-range), and drive range (D-range), or a parking mechanism for switching between the P-range and the non-P-range.

The shift-by-wire system has an electronic controller as exemplarily disclosed in JP 2008-184985A (US 2008/0182717 A1). The controller includes a range changeover control ECU, a motor driving circuit and the like. Moreover, the controller is electrically connected to a range detecting device that outputs a signal representing the target range selected by the range changeover operation of the driver, a motor which is a driving source of the range changeover mechanism, and an output shaft sensor that detects an actual range attained in the vehicle transmission. The motor includes an encoder that outputs a pulse signal (encoder signal) in synchronization with rotation of a rotor of the motor. The control ECU sets a target rotation angle (a target value of the encoder count value) corresponding to the signal representing the target range output from the range detecting device. The control ECU energizes the motor via the motor driving circuit in accordance with the set target rotation angle to thereby control the driving of the motor. In this case, the control ECU performs feedback-control on the motor so that the count value of the pulse signal output from the encoder stops at a position identical to the target value. In this way, the range is changed to the target range selected by the driver. The control ECU monitors whether the detected actual range is identical to the target range based on the output of the output shaft sensor.

The electronic controller in the shift-by-wire system may be divided to a first electronic controller and a second electronic controller. The first electronic controller includes a shift determination unit that determines a range changeover operation of a driver to determine a target range and outputs a range changeover request to a target range. The second electronic controller includes a motor control unit that controls driving of a motor in accordance with the range changeover request of the shift determination unit to move a changeover mechanism that changes a range to change the range to the target range. According to such a divided configuration, even when the determination content of the range changeover operation or the type of the motor is changed, only one controller need be replaced.

Moreover, according to such a divided configuration, the motor control unit of the second electronic controller can detect an abnormality when the state of the changeover mechanism does not correspond to the target range within a predetermined period after the driving control is started. Similarly, the shift determination unit of the first electronic controller can detect an abnormality when the state of the changeover mechanism acquired from the motor control unit does not correspond to the target range within a predetermined period after the range changeover request is output. Moreover, each of the first and the second electronic controllers may store abnormality information for diagnosing or analyzing the cause of abnormality when an abnormality is detected.

However, when an abnormality occurs in the motor control unit of the second electronic controller, only the shift determination unit of the first electronic controller can detect the abnormality. Thus, although the abnormality information is stored in the first electronic controller, it is not stored in the second electronic controller. It is thus difficult to diagnose the cause of abnormality unless the abnormality information is stored in the second electronic controller including the motor control unit where an abnormality has occurred.

SUMMARY

It is therefore an object to provide a shift-by-wire system capable of diagnosing the cause of abnormality easily.

According to one aspect, a shift-by-wire system comprises a first electronic controller and a second electronic controller provided for an automatic transmission of a vehicle. The first electronic controller includes a shift determination unit that determines a range changeover operation for a target range of a transmission selected by a driver and outputs a range changeover request for the target range. The second electronic controller includes a motor control unit that controls driving of a motor in accordance with the range changeover request of the shift determination unit to drive a changeover mechanism that changes a range of the transmission to change the range to the target range.

The motor control unit is configured to acquire a signal representing a state of the changeover mechanism and detect an abnormality when a detected state of the changeover mechanism indicates that the changeover mechanism does not attain the target range after motor driving control is started. The shift determination unit is configured to detect an abnormality when the detected state of the changeover mechanism acquired from the motor control unit indicates that the changeover mechanism does not attain the target range after the range changeover request is output. The first electronic controller includes a first memory unit that stores first diagnosis information for diagnosing the abnormality including a state of the first electronic controller when the shift determination unit detects the abnormality. The second electronic controller includes a second memory unit and an abnormality check unit. The second memory unit is configured to store second diagnosis information for diagnosing the abnormality including a state of the second electronic controller when the motor control unit detects the abnormality. The abnormality check unit is configured to compare the state of the changeover mechanism outputted to the shift determination unit by the motor control unit with the target range and store the second diagnosis information in the second memory unit when the changeover mechanism does not attain the target range after the state of the changeover mechanism is outputted and the motor control unit does not detect the abnormality.

BRIEF DESCRIPTION OF THE DRAWINGS

The above and other objects, features and advantages will become more apparent from the following detailed description made with reference to the accompanying drawings. In the drawings:

FIG. 3A is a graph showing a relation between a failure component and a replacement target component in the embodiment;

FIG. 3B is a graph showing a relation between a failure component and a replacement target component in a comparative example;

DETAILED DESCRIPTION OF THE EMBODIMENT

Figure 1:
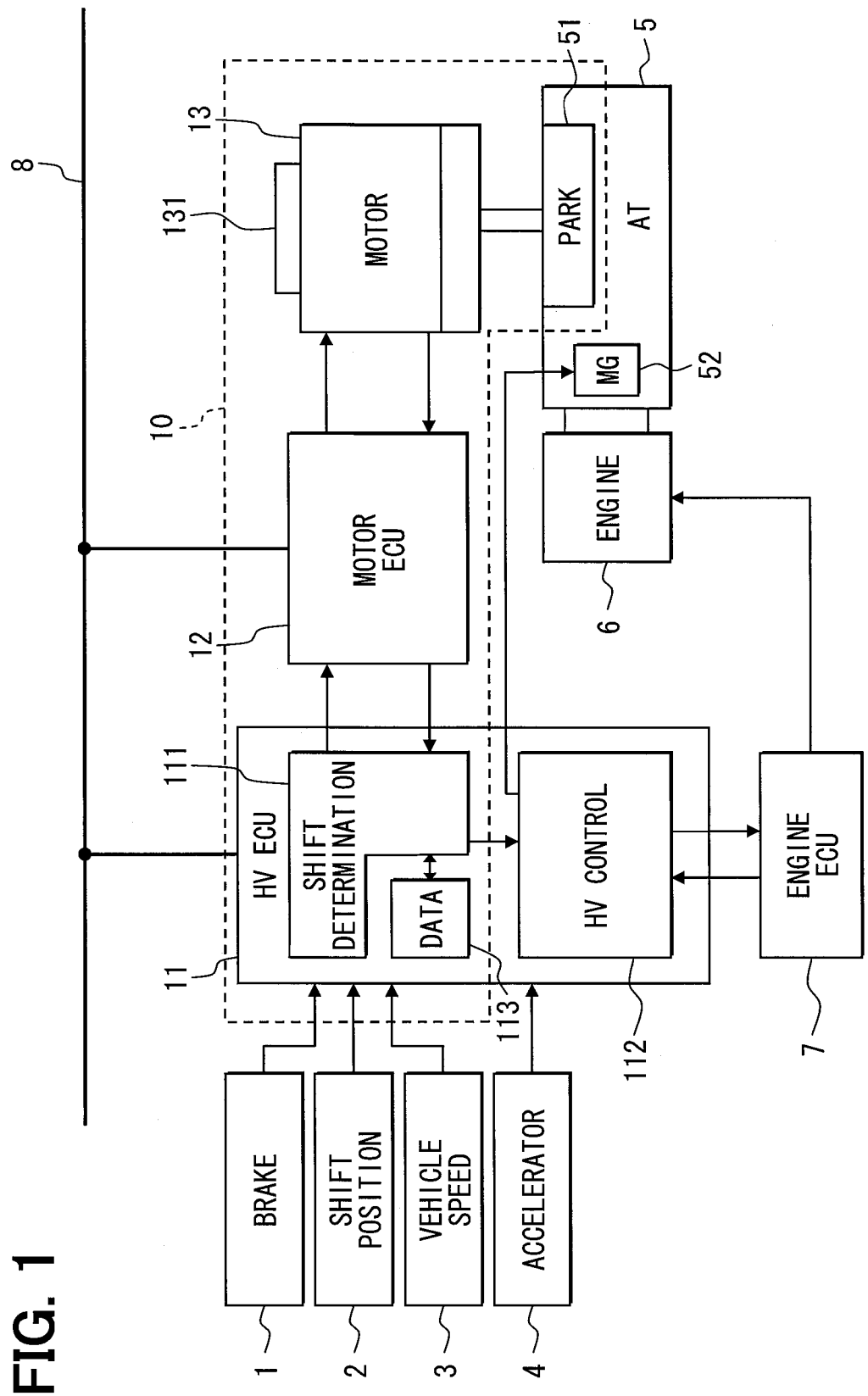
FIG. 1 is a block diagram showing schematically an in-vehicle control system including a shift-by-wire system according to one embodiment.

Referring to FIG. 1, a shift-by-wire system (SBW system) 10 is mounted on a hybrid vehicle (HV), which has an internal combustion engine 6 and a motor-generator (MG) 52 provided in a transaxle 5. The transaxle 5 includes an automatic transmission mechanism, a differential gear mechanism and the like. The transaxle 5 may thus be regarded as the automatic transmission for simplicity in the following description. The engine 6 and the motor-generator 52 serve as a power source that drives vehicle tire wheels (not shown) through the transaxle 5. The SBW system 10 is employed as a part of an in-vehicle control system of the hybrid vehicle.

The in-vehicle control system including the SBW system 10 is configured to include sensors such as a brake sensor 1, a shift position sensor 2, a vehicle speed sensor 3, and an accelerator sensor 4, electronic controllers such as an engine ECU (electronic control unit) 7, a HV ECU (hybrid ECU, first electronic controller) 11, and a motor ECU (second electronic controller) 12, and a communication bus 8 connecting the transaxle 5, the engine 6, the HV ECU 11 and the motor ECU 12.

The brake sensor 1 detects the amount of depression of a brake pedal provided in the vehicle to output detected brake information (brake pedal position signal). The shift position sensor 2 detects an operation state of a shift operation unit (a shift lever, a parking switch, and the like) provided in the vehicle to output detected shift position information (shift position signal). The vehicle speed sensor 3 detects the travel speed of the vehicle to output detected vehicle speed information. The accelerator sensor 4 detects the amount of depression of an accelerator pedal provided in the vehicle to output detected acceleration information (acceleration opening degree signal). These detection signals (brake informa-tion, vehicle speed information, shift position information, and acceleration information) are input to the HV ECU 11.

The engine ECU 7 is mainly configured of a microcomputer including a power supply circuit, an I/O (input/output circuit), a CPU (central processing unit), a RAM (random access memory), a ROM (read only memory), and the like, and is electrically connected to the HV ECU 11, the engine 6, and the like. The engine ECU 7 executes a predetermined processing operation such as engine control by the CPU, which communicates with the HV ECU 11 and the engine 6 via an I/O, reads programs stored in advance in the ROM or the like into the RAM, and executes the programs.

Specifically, the engine ECU 7 controls the driving of the engine 6 by outputting a driving signal to a fuel injector, a spark ignition device, and the like in a conventional manner in response to a request from the HV ECU 11. Moreover, the engine ECU 7 outputs data regarding an operation state of the engine 6 as necessary based on signals from an A/F sensor, a rotation sensor, an air flow sensor, a throttle sensor, and a water temperature sensor.

The HV ECU 11 is mainly configured of a microcomputer including a power supply circuit, an I/O, a CPU, a RAM, a ROM and the like, and is electrically connected to sensors 1, 2, 3, 4, the engine ECU 7, the motor ECU 12, the motor-generator 52 and the like. The HV ECU 11 includes a data memory unit 113 which is configured of a nonvolatile memory device such as an EEPROM and which corresponds to a first storage unit.

Figure 2:
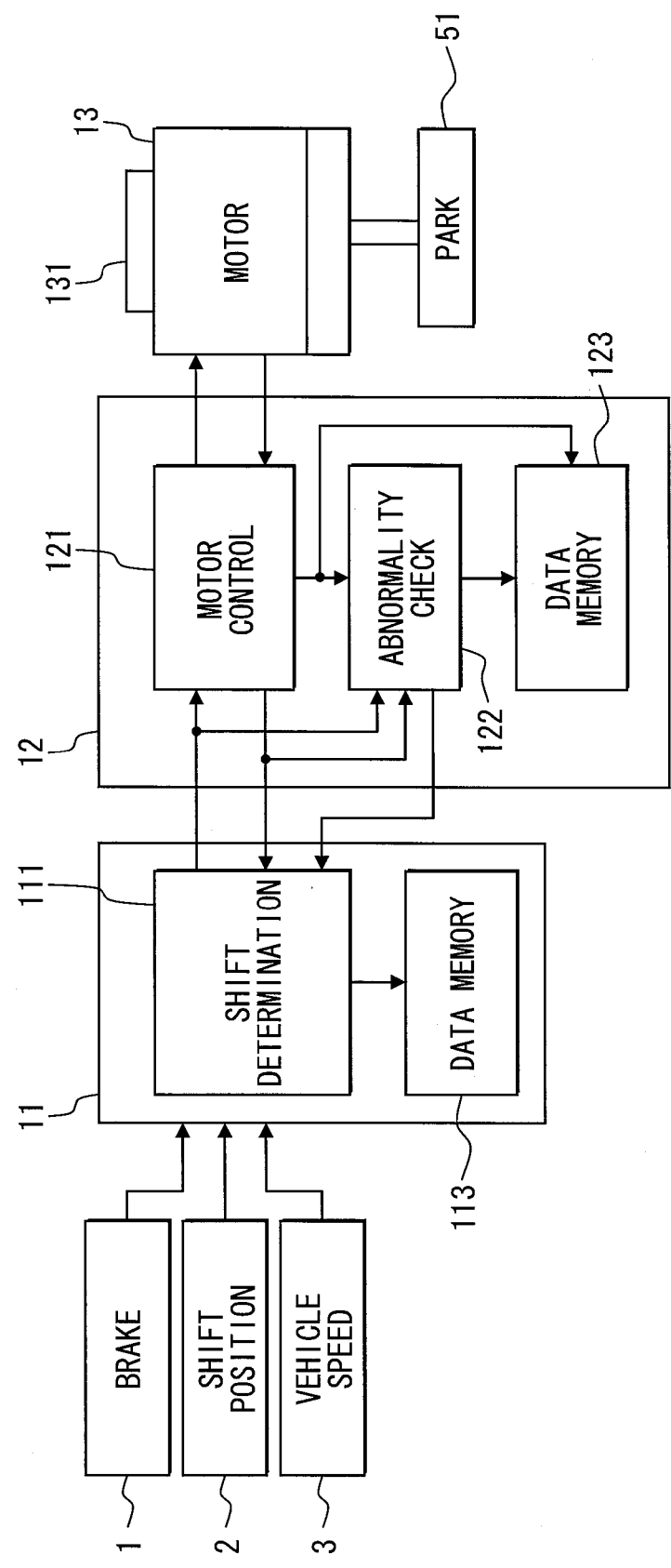
FIG. 2 is a block diagram showing schematically the shift-by-wire system shown in FIG. 1.

Moreover, as shown in FIGS. 1 and 2, the HV ECU 11 includes functional blocks mainly including a shift determination unit 111, a HV control unit 112, and the data memory unit 113. Thus, the HV ECU 11 includes a shift check function, a HV control function, and a storing function. Moreover, the shift determination unit 111 and the HV control unit 112 can be configured as individual microcomputers. Thus, the HV ECU 11 includes a microcomputer that forms the shift determination unit 111 and a microcomputer that forms the HV control unit 112.

Moreover, the shift determination unit 111 is electrically connected to the data memory unit 113, and is configured to be capable of storing data in the data memory unit 113.

Moreover, the HV ECU 11 is provided as a first electronic controller. Thus, the HV ECU 11, which includes the shift determination unit 111 and the data memory unit 113, is included in the SBW system 10.

The HV ECU 11 configured as above executes a predetermined processing operation by its CPU, which communicates with sensors 1, 2, 3, 4, the engine ECU 7, and the motor ECU 12 via its I/O, reads programs stored in the ROM or the like into the RAM, and executes the programs in the conventional manner. For example, the HV control unit 112 calculates a driver request output based on the shift position information, the accelerator information or the like and outputs a driving signal to the motor-generator 52 in response to a driving state (for example, a change request) from the shift determination unit 111.

Moreover, for example, the shift determination unit 111 determines a range changeover operation of a driver from brake information, vehicle speed information, and shift position information to determine a target range of the automatic transmission. Moreover, the shift determination unit 111 outputs a changeover request to the P-range or a P-range release request (changeover request to the non-P-range) to a motor control unit 121 included in the motor ECU 12. Furthermore, when the determined target range is not the P-range, the shift determination unit 111 outputs a changeover request to each of the N (neutral), R (reverse), and D (drive) ranges to the HV control unit 112 upon receiving a signal (parking mechanism 51 state or the range position information) representing the non-P-range from the motor control unit 121. That is, the shift determination unit 111 outputs a changeover request to the P-range as a range changeover request or a changeover request to the non-P-range as a range changeover request to the motor control unit 121 included in the motor ECU 12. The shift determination unit 111 outputs a signal representing the target range (request range) to the motor control unit 121 included in the motor ECU 12.

The P-range or the non-P-range corresponds to a target range. Thus, the changeover request (changeover request to the P-range and changeover request to the non-P-range) which is output to the motor control unit 121 by the shift determination unit 111 corresponds to a range changeover request. On the other hand, the changeover request which is output to the HV control unit 112 by the shift determination unit 111 is different from a range changeover request according to the embodiment. However, the range changeover request is not limited to the changeover request to the P-range and the changeover request to the non-P-range.

Moreover, the shift determination unit 111 compares the range changeover request (target range) with range position information (that is, the state of the parking mechanism 51, which is the P-range, the non-P-range, or an indefinite range) acquired from the motor control unit 121. If there is a difference between the range changeover request and the range position (that is, the two positions are not identical), it is determined that abnormality is present or detected. The shift determination unit 111 thus detects abnormality based on a response difference between the range changeover request and the range position actually detected. More specifically, the shift determination unit detects that an abnormality is present when the range position acquired from the motor control unit 121 does not reach the target range in a predetermined period after the range changeover request is output to the motor control unit 121.

The parking mechanism 51 changes its range with the rotation of the motor 13. Moreover, the motor control unit 121 is configured to detect the actual range position based on a count value of an encoder signal output from an encoder 131 in synchronization with the rotation of the motor 13. Thus, the range position detected by the motor control unit 121 includes an indefinite range (a range that is not the P-range nor the non-P-range).

Furthermore, when the presence of abnormality is detected by the shift determination unit 111, the first diagnosis information for diagnosing or analyzing the cause of abnormality including the state (internal state and output state) of the HV ECU 11 is stored in the data memory unit 113. That is, when the presence of abnormality is detected, the shift determination unit 111 stores (writes) the first diagnosis information in the data memory unit 113. In this way, by storing the first diagnosis information including the state of the HV ECU 11 so that a car dealer, repair shop or the like analyzes the first diagnosis information to diagnose which sequence results in an unintended operation, it is possible to specify the cause of abnormality.

The following information can be employed as the content of the first diagnosis information. Examples thereof include vehicle time information (accumulated ON time of ignition switch IG), a vehicle start count (ON count of IG), a start count of the HV ECU 11, a start time (accumulated period) of the HV ECU 11, a power supply state (for example, normal, temporary blackout, or the like), brake information, shift position information, vehicle speed information, a range changeover request, a previous value of the range changeover request, an internal state of the shift determination unit 111 (a range changeover request determined for a range changeover operation of an driver), range position information, a previous value of the range position information, and a detected abnormality type (that is, a diagnostic code). The shift determination unit 111 stores these information items in the RAM upon acquiring the information items. Then, the shift determination unit 111 updates the content stored in the RAM with the acquired information every predetermined time.

Among these information items, the vehicle time information and the vehicle start count may be acquired from another system or another ECU via communication bus. The vehicle time information and the vehicle start count may be used for identifying the timing of abnormality occurrence and the state. Moreover, the start count of the HV ECU 11, the start time of the HV ECU 11, and the power supply state can be measured by itself (the HV ECU 11). The start count of the HV ECU 11, the start time of the HV ECU 11, and the power supply state may be used for identifying the timing of abnormality occurrence and the state.

Moreover, the brake information, the shift position information, and the vehicle speed information may be acquired from sensors 1, 2, 3. The brake information, the shift position information, and the vehicle speed information may be used for identifying the driver operation. Moreover, the range changeover request, the previous value of the range changeover request, and the internal state of the shift determination unit may be acquired by the HV ECU 11 itself. The range changeover request, the previous value of the range changeover request, and the internal state of the shift determination unit may be used for verifying the validity of the range changeover request with respect to the operation of the driver. Moreover, the range position information and the previous value of the range position information may be acquired from the motor control unit 121. The range position information and the previous value of the range position information may be used for verifying the validity of the range position for the range changeover request. Moreover, the detected abnormality type (that is, the diagnostic code) may be used for checking the content of abnormality. However, the first diagnosis information is not limited to this.

The processing operation of the shift determination unit 111 will be described in detail later. When acquiring signals from the brake sensor 1 and the shift position sensor 2, the shift determination unit 111 may compare the signals by a dual system and detect an abnormality. By doing so, it is possible to improve reliability.

The motor ECU 12 is mainly configured of a microcomputer including a power supply circuit, an I/O, a CPU, a RAM, a ROM, and the and is electrically connected to the HV ECU 11, the motor 13, and the like. As shown in FIG. 2, the motor ECU 12 includes a data memory unit 123 which is configured of a nonvolatile memory device such as an EEPROM and which corresponds to a second memory unit.

Moreover, the motor ECU 12 includes functional blocks mainly including the motor control unit 121 and a comparison or check processing unit (check unit) 122. Thus, the motor ECU 12 includes a motor control function, a comparing processing function (check function), and a storing function.

The motor ECU 12 is provided as a second electronic controller. The motor ECU 12, the motor control unit 121 included in the motor ECU 12, the abnormality check unit 122, and the data memory unit 123 are included in the SBW system 10. That is, the motor ECU 12, the motor control unit 121, the abnormality check unit 122, and the data memory unit 123 also form a part of the SBW system 10.

The motor ECU 12 executes a predetermined processing operation by the CPU, which communicates with the shift determination unit 111 and the motor 13 via the I/O, reads programs stored in the ROM or the like into the RAM, and executes the programs. For example, the motor control unit 121 receives the range changeover request (changeover request to the P-range or changeover request to the non-P-range) from the shift determination unit 111 to issue the driving signal, which energizes respective phases U, V, and W of the motor 13 and which is output by the turn-on and turn-off of an energization transistor of the motor ECU 12 for driving the motor 13. That is, the motor control unit 121 outputs the driving signal in response to the range changeover request from the shift determination unit 111 to control the driving of the motor 13. Moreover, by controlling the driving of the motor 13 in this way, the motor control unit 121 moves the parking mechanism 51 (changeover mechanism) to change the range to the target range. Specifically, the motor control unit 121 converts the target range (changeover request range) to a pulse signal corresponding to the target range position to perform energization of the U-phase and counts up by 1 in response to the encoder signal. Then, the motor control unit 121 performs the subsequent energization of the U-phase and counts up by 1 in response to the encoder signal. This is repeatedly performed until the detected range position reaches the target position.

Moreover, the motor control unit 121 detects and determines the range position by detecting the rotor position from the encoder signal output from the encoder 131 included in the motor 13. That is, the motor control unit 121 acquires the range position by acquiring the encoder signal and counting the pulses of the encoder signal. The range position is detected in the conventional manner. The motor control unit 121 outputs the range position information representing the detected range position to the shift determination unit 111.

Moreover, the motor control unit 121 compares the target range with the detected range position. Specifically, the motor control unit 121 compares the driving signal output by the motor control unit 121 with the count value of the encoder signal output from the encoder 131. If there is a difference between the range position and the target range (that is, the two positions are not identical), the presence of abnormality is detected. The motor control unit 121 thus detects abnormality based on a response difference between the target range and the range position. More specifically, the motor control unit 121 detects that there is an abnormality when the range position does not reach the target range in a predetermined period after the control of the driving of the motor 13 is started. In this way, the motor control unit 121 detects an abnormality based on a difference between the driving signal and the motor encoder sensor signal.

Moreover, the abnormality check unit 122 is configured to compare the range position represented by the range position information which is output to the shift determination unit 111 by the motor control unit 121 with the target range. When the range position does not reach the target range in a predetermined period after the range position information is output, and no abnormality is detected by the motor control unit 121, the abnormality check unit 122 stores in the data memory unit 123 this check result (comparison result) as second diagnosis information.

When an abnormality is detected by the motor control unit 121, the second diagnosis information for analyzing the cause of abnormality including the state (internal state and output state) of the motor ECU 12 is stored in the data memory unit 123. That is, when an abnormality is detected, the motor control unit 121 stores by writing the second diagnosis information in the data memory unit 123. Moreover, the SBW system 10 is characterized in that the abnormality check unit 122 also stores the second diagnosis information in the data memory unit 123. In this way, by storing the second diagnosis information including the state of the motor ECU 12, a dealer, a repair shop and the like are enabled to analyze the second diagnosis information to specify at which control sequence an unintended operation occurred. It is thus possible to specify the cause of abnormality.

The following information can be employed as the content of the second diagnosis information. Examples thereof include the vehicle time information (accumulated ON time of IG), the vehicle start count (ON count of IG), the start count of the motor ECU 12, the start time (accumulated period) of the motor ECU 12, the power supply state (for example, normal, temporary blackout, or the like), the range changeover request from the shift determination unit 111, the previous value of the range changeover request, the motor control mode in the motor control unit 121, the driving signal (driving request) to the motor 13, the encoder signal from the encoder 131, the range position information acquired (calculated) by itself, the previous value of the range position information, the output range position information, the signal representing an abnormality data cancel request, and the detected abnormality type (that is, a diagnostic code). Examples of the motor control mode includes an initial driving mode where a difference between the rotor position detected at the beginning of motor driving (at the beginning (the beginning of IG ON) of the start of energization of the motor ECU 12) and a reference position of the energization phase, the position detection mode where the motor 13 is driven up to a movable limit to detect the position, the feedback driving mode where the subsequent energization phase is determined based on the encoder signal to move to the target position, and a fail-safe driving mode where the energization phase is determined at the predetermined sequence or time to rotate the motor 13.

Moreover, the motor control unit 121 stores these pieces of information in the RAM upon acquiring the information. Then, the motor control unit 121 updates the content stored in the RAM with the acquired information every predetermined time.

Among these information items, the vehicle time information and the vehicle start count can be acquired from another system or another ECU via the communication bus. The vehicle time information and the vehicle start count may be used for identifying the timing and the state of abnormality occurrence. Moreover, the start count of the motor ECU 12, the start time of the motor ECU 12, and the power supply state may be measured by itself (the motor ECU 12). The start count of the motor ECU 12, the start time of the motor ECU 12, and the power supply state can be used for understanding the timing and the state of abnormality occurrence. Moreover, the range changeover request from the shift determination unit 111 and the previous value of the range changeover request can be used for identifying a range changeover request. Furthermore, the motor control mode in the motor control unit 121 can be acquired by itself (the motor ECU 12). The motor control mode in the motor control unit 121 can be used for verifying the validity of the range changeover request and the driving request to the motor 13.

Moreover, the driving signal (driving request) to the motor 13 and the encoder signal from the encoder 131 can be used for verifying whether the driving energization to the motor and the encoder signal corresponding thereof are valid or not. Moreover, the range position information acquired or calculated by itself and the previous value of the range position information may be used for verifying the validity of the range position determined based on the encoder signal from the encoder 131 and the range changeover request. Moreover, the output range position information and the signal representing the abnormality data cancel request can be used for verifying the validity of transmission information (range position information). Moreover, the detected abnormality type (that is, the diagnostic code) can be used for checking the content of abnormality. However, the second diagnosis information is not limited to this.

The processing operation of the motor ECU 12 (the motor control unit 121 and the abnormality check unit 122) will be described in detail later.

The motor 13 rotates in accordance with the driving signal from the motor control unit 121. The motor 13 may be, for example, a switched reluctance motor (SR motor). This motor 13 is also called a variable reluctance motor, which does not require permanent magnets and brushes, and which is an inexpensive motor having a simple structure.

The motor 13 includes a stator and a rotor which both has a salient pole structure (salient-pole portion). The rotor of the motor 13 includes plural (for example, eight) salient-pole portions which protrude outward in a radial direction and which are arranged at equal intervals in a circumferential direction. That is, the salient-pole portions are formed at equal intervals on the outer circumference of the rotor.

On the other hand, the stator of the motor 13 includes plural (for example, twelve) salient-pole portions which protrude inward in the radial direction and which are arranged at equal intervals in the circumferential direction. That is, the salient-pole portions are formed at equal intervals on the inner circumference of a cylindrical stator. Moreover, the respective salient-pole portions of the rotor sequentially face the respective salient-pole portions of the stator via a very small gap in accordance with the rotation of the rotor. Moreover, coils are sequentially wound on the salient-pole portions of the stator. For example, coils may be wired so that a total of six coils for the U, V, and W phases and a total of six coils for the U', V', and W' phases are sequentially wound on the twelve salient-pole portions of the stator to form a motor excitation portion of two systems. Naturally, the number of the salient-pole structures of the stator and the rotor may be changed appropriately.

Moreover, the encoder 131 for detecting the rotational position of the rotor is included in the motor 13. The encoder 131 is configured as a magnetic rotary encoder, and specifically, has a configuration in which a ring-shaped rotary magnet including N and S poles magnetized alternately at equal intervals in the circumferential direction is coaxially fixed to a side surface of the rotor, and a magnetic detection element such as a Hall IC is disposed at a position facing the rotary magnet. Moreover, the encoder 131 outputs an encoder signal (pulse signal) to the motor control unit 121 in synchronization with the rotation of the rotor of the motor 13.

The parking mechanism 51 is a changeover mechanism which moves with the rotation of the rotor of the motor 13 and changes the range to the P-range or the non-P-range in the conventional manner.

Here, referring to FIGS. 3A, 3B to 6, the processing operation of the shift determination unit 111, the motor control unit 121, and the abnormality check unit 122 of the SBW system 10 will be described. The shift determination unit 111 performs the processing operation shown in FIG. 4. The motor control unit 121 performs the processing operation shown in FIG. 5. The abnormality check unit 122 performs the processing operation shown in FIG. 6.

Figure 4:
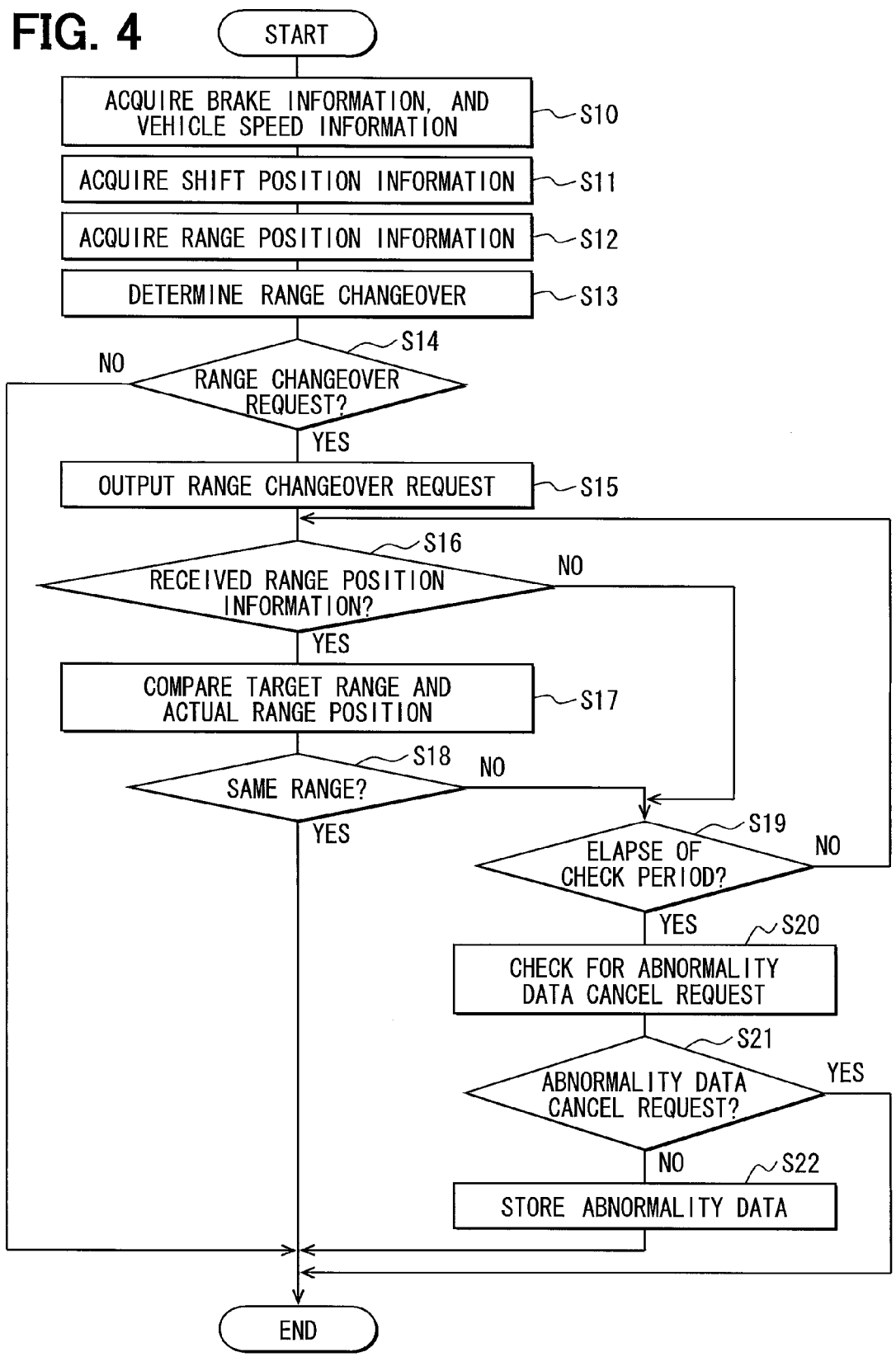
FIG. 4 is a flowchart showing a processing operation of a shift determination unit in the embodiment.
Figure 5:
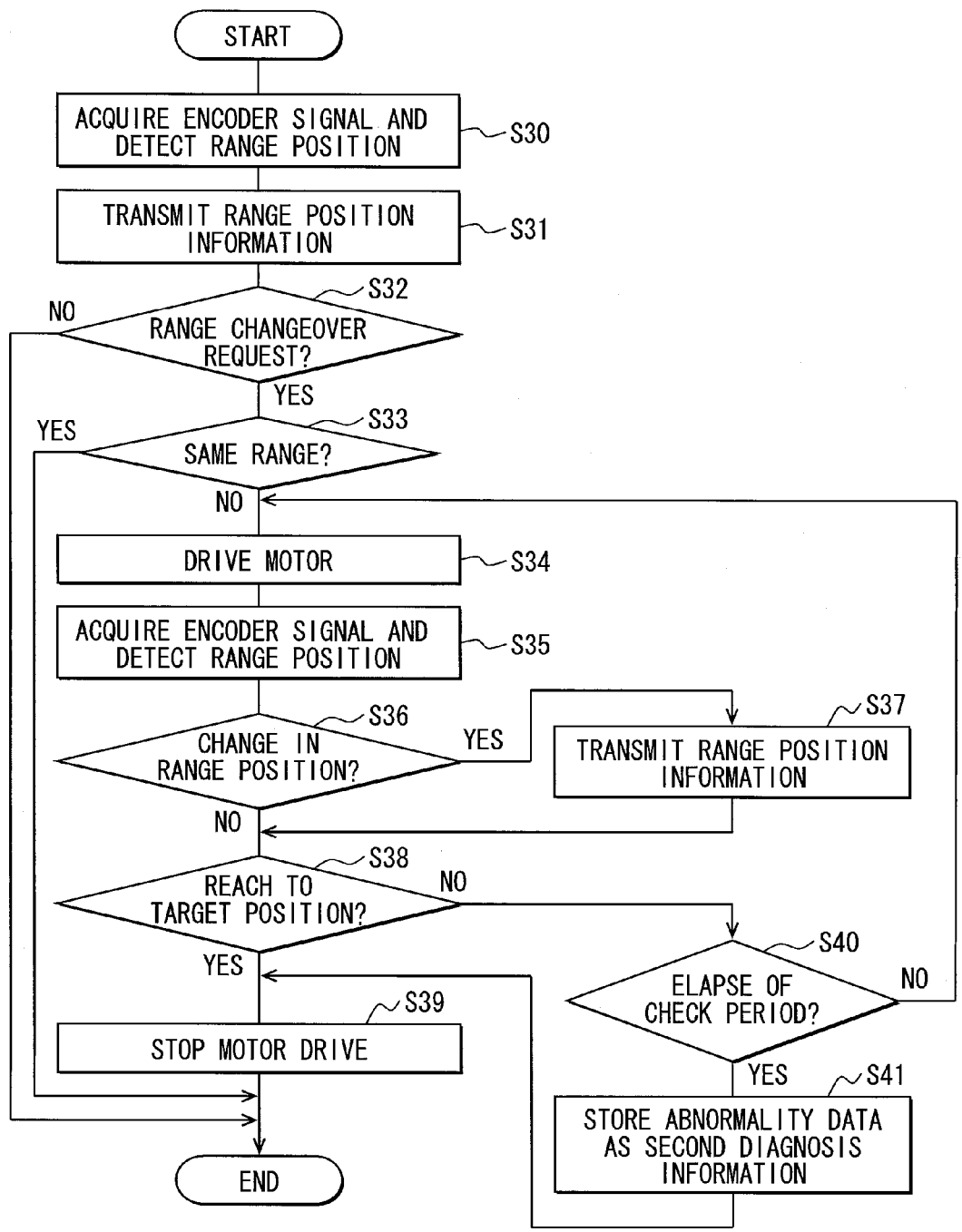
FIG. 5 is a flowchart showing a processing operation of a motor control unit in the embodiment.
Figure 6:
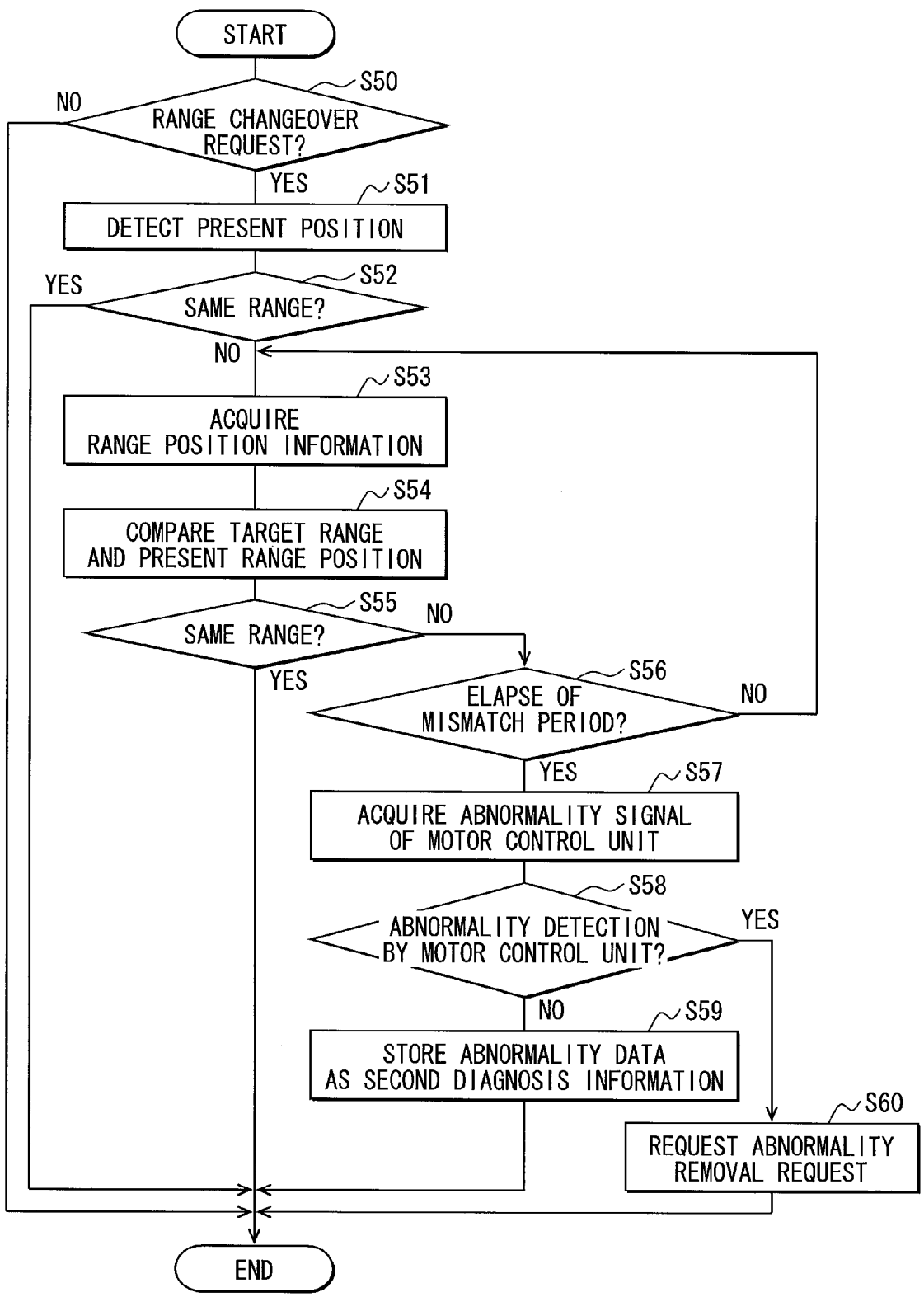
FIG. 6 is a flowchart showing a processing operation of a comparing processing unit in the embodiment.

The shift determination unit 111 in the HV ECU 11 starts the processing operation of FIG. 4 when the IG of the hybrid vehicle is turned on, and repeatedly executes this processing operation every predetermined time during the IG-ON state. The motor control unit 121 in the motor ECU 12 starts the processing operation of FIG. 5 when the IG of the hybrid vehicle is turned on, and repeatedly executes this processing operation every predetermined time during the IG-ON state. The abnormality check unit 122 in the motor ECU 12 starts the processing operation of FIG. 6 when the IG of the hybrid vehicle is turned on, and repeatedly executes this processing operation every predetermined time during the IG-ON state. That is, the processing operations shown in FIGS. 4 to 6 are executed in parallel, that is, in time-shared manner.

First, the processing operation of the shift determination unit 111 will be described. In step S10 of FIG. 4, the brake information output from the brake sensor 1 and the vehicle speed information output from the vehicle speed sensor 3 are acquired. In step S11, the shift position information output from the shift position sensor 2 is acquired. The shift determination unit 111 determines a range changeover operation of a driver based on the brake information, the vehicle speed information and the shift position information acquired in this way. The shift determination unit 111 determines the target range (request range) which is a range selected by the driver. Thus, in this step, it is checked whether the driver requests the changeover to the P-range or the changeover to the non-P-range.

Moreover, in step S12, the range position information representing the actual or present range position is acquired from the motor control unit 121. The motor control unit 121 detects the range position (step S30 of FIG. 5) and outputs the range position information representing the detected range position to the shift determination unit 111 (step S31 of FIG. 5).

Moreover, in step S13, the range changeover determination is made. That is, the shift determination unit 111 compares the range changeover operation (the P-range or the non-P-range) of the driver determined by itself with the present range position (the P-range or the non-P-range) represented by the range position information to thereby determine whether there is a range changeover request. That is, the comparison herein is made for determining whether the range changeover is necessary in response to the range changeover operation of the driver.

Then, in step S14, it is checked whether there is the range changeover request. In this case, if the range changeover operation of the driver is different from the present range position represented by the range position information, the shift determination unit 111 determines that there is the range changeover request. On the other hand, if the range changeover operation (target range) of the driver is the same as the present range position represented by the range position information, the shift determination unit 111 determines that there is not the range changeover request. When it is determined that there is the changeover request (YES), step S15 is executed. When it is determined that there is not the changeover request (NO), the processing operation. For example, when it is determined that the driver is requesting the changeover of range from the P-range to the non-P-range, and the present range position is the P-range, the shift determination unit 111 determines that there is the changeover request. In contrast, when it is determined that the driver is requesting the changeover of range from the non-P-range to the P-range, and the actual range position is the P-range, the shift determination unit 111 determines that there is not the changeover request.

In step S15, the range changeover request is output. That is, a signal representing the range changeover request to the target range (that is, a signal representing the target range or the request range) is output. The signal representing the range changeover request is output to the motor control unit 121. That is, the changeover to the range (the target range or the request range) requested by the driver is requested to the motor control unit 121. In this case, the motor control unit 121 controls the driving of the motor 13 based on the range changeover request (step S34 of FIG. 5), detects the range position (steps S35 to S37 of FIG. 5) and outputs the range position information (that is, information representing any one of the P-range, the indefinite range, and the non-P-range) representing the range position to the shift determination unit 111. The range position information is also output to the abnormality check unit 122.

Moreover, the signal representing the range changeover request is also output to the abnormality check unit 122. The abnormality check unit 122 compares the range changeover request output from the shift determination unit 111 with the range position information (the range position) output from the motor control unit 121 to thereby determine whether the motor control unit 121 is normal (steps S54 to S56 of FIG. 6).

In step S16, it is checked whether the range position information is received from the motor control unit 121. When it is determined that the range position information is received (YES), step S17 is executed. When it is determined that the range position information is not received (NO), step S19 is executed.

In step S17, the range (the target range or the request range) requested by the driver determined in the above-described manner is compared with the range position represented by the present range position information (that is, information representing any one of the P-range, the indefinite range, the non-P-range) acquired from the motor control unit 121. As described above, the motor control unit 121 controls the driving of the motor 13 based on the range changeover request (step S34 of FIG. 5). Thus, the range position herein is the range position after the motor control unit 121 controls the driving of the motor 13 based on the range changeover request. That is, the comparison therein is for determining whether the state of the parking mechanism 51 has reached the target range selected by the driver.

In step S18, it is checked whether the target range is the same as the range position detected as the present actual range position. When the two ranges are determined not the same (NO), step S19 is executed. When the two ranges are determined to be the same, this processing operation of FIG. 4 ends.

However, it takes a predetermined time until the range of the parking mechanism 51 is completely changed to the target range after the shift determination unit 111 outputs the signal representing the range changeover request (after the range changeover request is output) in step S15. However, when the range is not completely changed in spite of elapse of the predetermined time, which is normally required for the parking mechanism 51 to completely change its range to the target range after the signal representing the range changeover request is output, it can be regarded that there is an abnormality.

Therefore, in step S19, it is checked whether an elapsed time after the shift determination unit 111 outputs the signal representing the range changeover request (after the range changeover request is output) is longer than an abnormality check period. When it is determined that the abnormality check period has elapsed (YES), step S20 is executed. When it is determined that the abnormality check period has not elapsed (NO), step S16 is executed again. That is, the shift determination unit 111 detects that there is an abnormality when the state of the parking mechanism 51 acquired from the motor control unit 121 indicates that the parking mechanism 51 has not attained the target range in a predetermined period after the range changeover request is output.

In step S20, an abnormality data cancel request from the abnormality check unit 122 is checked. That is, it is checked whether a signal representing the abnormality data cancel request is received from the abnormality check unit 122. Moreover, in step S21, when it is determined that there is not the abnormality data cancel request (NO), step S22 is executed. When it is determined that there is the abnormality data cancel request (YES), the processing operation of FIG. 4 ends. As will be described later, the abnormality check unit 122 outputs the abnormality data cancel request or a signal representing the abnormality data cancel request when a predetermined condition is satisfied (step S60 of FIG. 6).

In step S22, the abnormality determination is made (it is determined that there is an abnormality), and the abnormality data is stored. Specifically, the abnormality data is stores as the first diagnosis information in the data memory unit 113. When the shift determination unit 111 detects that there is the abnormality, it is possible to store the first diagnosis information for analyzing the cause of abnormality including the state of the HV ECU 11 in the data memory unit 113.

When the abnormality data cancel request is received, the shift determination unit 111 does not store the first diagnosis information in spite of the fact that the abnormality is detected. That is, when the abnormality data cancel request is received, the shift determination unit 111 regards that there is not the abnormality in spite of the fact that the abnormality is detected.

Next the processing operation of FIG. 5 executed by the motor control unit 121 will be described. In step S30, the present position (actual present range position) of the parking mechanism 51 is detected. In this case, the motor control unit 121 detects the present position by counting the encoder signal (pulse signal) from the encoder 131 of the motor 13. When the IG of the hybrid vehicle is turned on, the motor ECU 12 performs control of the initial driving mode and the position detection mode as described above. That is, when performing the processing operation of FIG. 5, the motor ECU 12 drives the motor 13 to rotate. This is to correct a positional change due to deterioration with time and variation with time.

In step S31, the range position information representing any one of the P-range, the indefinite range and the non-P-range detected in step S30 is output or transmitted to the shift determination unit 111.

In step S32, it is checked whether there is the range changeover request from the shift determination unit 111, that is, whether the signal representing the range changeover request is received. Moreover, when it is determined that there is the range changeover request (YES), step S33 is executed. When it is determined that there is not the range changeover request (NO), the processing operation of FIG. 5 ends.

In step S33, the range changeover request (request range) is compared with the present range position to determine whether the request range is the same as the present position. When the two positions are determined to be different and not the same (NO), step S34 is executed. When the two positions are determined to be the same, the processing operation of FIG. 5 ends.

In step S34, the driving of the motor 13 is controlled based on the range changeover request. In this case, the motor control unit 121 outputs the driving signal in response to the range changeover request (changeover request to the P-range or changeover request to the non-P-range) from the shift determination unit 111 to thereby control the driving of the motor 13.

In step S35, the encoder signal is acquired from the encoder 131 included in the motor 13, and the moving position of the motor 13 is detected. That is, the motor control unit 121 detects the actual present range position based on the encoder signal. More specifically, the motor control unit 121 acquires the range position (signal representing the state of the changeover mechanism) by acquiring the encoder signal and counting the pulse count of the encoder signal. The motor control unit 121 determines the range position, that is, which is the state of the parking mechanism 51 and which is any one of the P-range, the non-P-range, and the indefinite range, by counting the pulse count of the encoder signal.

In step S36, it is checked whether the range position is changed. That is, it is checked whether the range position detected in step S35 has changed from the range position detected in step S30. Thus, it is checked whether the range position has changed by determining whether the pulse count (count value) of the encoder signal counted in step S35 is changed from the pulse count (count value) of the encoder signal counted in step S30. Moreover, when it is determined that the range position is changed (YES), step S37 is executed. When it is determined that the range position has not changed (NO), step S38 is executed. For example, when the range position is changed from the P-range to the indefinite range, when the range position is changed within the indefinite range, or when the range position is changed from the indefinite range to the non-P-range, it is determined that the range position is changed.

In step S37, the range position information (that is, the information representing any one of the P-range, the indefinite range and the non-P-range) representing the range position detected in step S35 is output and transmitted to the shift determination unit 111.

In step S38, it is checked whether the range position has reached the target position (target range). In this case, the motor control unit 121 determines whether the range position has reached the target position by determining whether the pulse signal corresponding to the target range is identical to the count value of the pulse count of the encoder signal output from the encoder 131. Moreover, when it is determined that the range position has reached the target position (YES), step S39 is executed. When it is determined that the range position has not reached the target position (NO), step S40 is executed.

When it is determined that the range position has reached the target position (YES), the driving of the motor is stopped in step S39. The motor control unit 121 stops the output of the driving signal to the motor 13 to stop the driving of the motor 13.

However, it takes a predetermined time until the range of the parking mechanism 51 is completely changed to the target range after the motor control unit 121 starts the driving of the motor 13 (after the output of the driving signal is started) in step S34 described above. Therefore, it is regarded that there is the abnormality, when the range is not completely changed in spite of an elapse of a predetermined time required for the parking mechanism 51 to be completely changed to the target range after the driving signal is output.

For this reason, when it is determined that the range position has not reached the target position (NO), it is checked is step S40 whether an elapsed time after the motor control unit 121 started the driving of the motor 13 (after the driving signal is output) is longer than the abnormality check period. When it is determined that the abnormality check period has elapsed (YES), step S41 is executed. When it is determined that the abnormality check period has not elapsed (NO), step S34 is executed again. That is, the motor control unit 121 detects that there is an abnormality when the state of the parking mechanism 51 has not reached the target range in the predetermined period after the driving of the motor 13 is started. In this way, when the motor control unit 121 detects that there is the abnormality, it is regarded that there is the abnormality in the motor 13 or the parking mechanism 51.

In step S41, the motor abnormality processing is performed, and the abnormality data is stored. Specifically, the abnormality data is stored as the second diagnosis information in the data memory unit 123. Here, the motor abnormality processing regards that there is the abnormality in the motor 13 or the parking mechanism 51 and outputs to the abnormality check unit 122 the abnormality signal representing that there is the abnormality in the motor 13 or the parking mechanism 51.

Next, the processing operation of FIG. 6 executed by the abnormality check unit 122 of the motor ECU 12 will be described. In step S50, it is checked whether there is the range changeover request from the shift determination unit 111, that is, whether the signal representing the range changeover request is received. Moreover, when it is determined that there is the range changeover request, step S51 is executed. When it is determined that there is not the range changeover request, the processing operation of FIG. 6 ends.

In step S51, the present position, that is, the present range position of the parking mechanism 51, is detected. In this case, the abnormality check unit 122 acquires the present position detected by the motor control unit 121.

In step S52, the range changeover request (request range) is compared with the present range position (present position) to thereby determine whether the request range is the same as the present position. When the two positions are determined not to the same (NO), step S53 is executed. When the two positions are determined to be the same (YES), the processing operation of FIG. 6 ends.

In step S53, the motor control unit 121 acquires the range position information output of the motor control unit 121 in step S36. Moreover, in step S54, the target range is compared with the present detected range position. That is, the signal representing the target range acquired from the shift determination unit 111 in step S50 is compared with the range position information acquired from the motor control unit 121 in step S53. In step S55, it is checked whether the target range is the same as the range position. When the two positions are determined to be not the same (NO), step S56 is executed. When the two positions are determined to the same (YES), the operation processing of FIG. 6 ends.

As described above, it takes the predetermined time until the range of the parking mechanism 51 is completely changed to the target range after the motor control unit 121 starts the driving of the motor 13, that is, after the output of the driving signal is started. Therefore, it can be regarded that there is the abnormality only when the range is not completely changed to the target range in spite of an elapse of the predetermined time, which is required for the parking mechanism 51 to be completely changed to the target range after the driving signal is output.

Therefore, when the target range and the range position are determined to be not the same (NO), it is checked in step S56 whether a mismatch period, during which the target range and the range position continue to be different), is longer than a predetermined period of continuation of different range. That is, the abnormality check unit 122 determines whether the period where the target range and the range position are not identical elapsed after the motor control unit 121 outputs the range position information to the shift determination unit 111 (and the abnormality check unit 122) is longer than the predetermined period. It is checked whether the period where the target range and the range position are not the same elapsed after starting the comparison between the signal representing the target range acquired from the shift determination unit 111 in step S50 and the range position information acquired from the motor control unit 121 in step S53 is longer than the predetermined period. When the mismatch period is longer than the predetermined period (YES), step S57 is executed. When the mismatch period is not longer than the predetermined period (NO), step S53 is executed again.

In step S57, a signal representing the occurrence of the abnormality in the motor control unit 121 is received. The abnormality check unit 122 checks whether the motor control unit 121 is determined to be abnormal, that is, whether the abnormality is detected. In step S58, when it is determined that the abnormality is detected in the motor control unit 121, that is, when the abnormality signal is received (YES), step S60 is executed. When it is determined that an abnormality is not detected in the motor control unit 121, that is, when the abnormality signal is not received from the motor control unit 121 (NO), step S59 is executed.

In step S59, data is stored. Specifically, the second diagnosis information is stored in the data memory unit 123. When it is detected that there is the abnormality in the motor control unit 121, the range position output by the motor control unit 121 will not attain the target range within the predetermined period. However, when no abnormality is detected in the motor control unit 121 (S58: NO) in spite of the fact that the range position (changeover mechanism state) output by the motor control unit 121 has not reached the target range in the predetermined period, it can be regarded that the abnormality is present in the motor control unit 121. That is, it can be regarded that the abnormality has occurred in the motor control unit 121, when the motor control unit 121 detects no abnormality although the input (target range) and the output (changeover mechanism state) of the motor control unit 121 are different even after the predetermined period. Thus, the abnormality check unit 122 checks whether the motor control unit 121 included in the same motor ECU 12 is abnormal Therefore, in step S59, when the range position (changeover mechanism state) output by the motor control unit 121 has not reached the target range within the predetermined period, and no abnormality is detected in the motor control unit 121, it is regarded that the abnormality has occurred in the motor control unit 121, and the second diagnosis information is stored in the data memory unit 123. That is, the abnormality check unit 122 included in the same motor ECU 12 as the motor control unit 121 stores the second diagnosis information in the data memory unit 123 in the motor ECU 12 in place of the abnormal motor control unit 121.

By the above-described operation, even when the abnormality has occurred in the motor control unit 121, the second diagnosis information can be stored in the motor ECU 12 including the motor control unit 121 where an abnormality has occurred. Thus, it is possible to analyze the cause of abnormality easily.

However, when the abnormality occurs in only the motor 13 and the parking mechanism 51, the motor control unit 121 receives the range position different from the target range. As a result, the motor control unit 121 outputs the range position (changeover mechanism state) different from the target range to the shift determination unit 111.

Therefore, in a comparative example which does not perform the processing operation of FIG. 6, the abnormality is detected in both the shift determination unit 111 and the motor control unit 121 as shown in FIG. 3B, when the abnormality (failure) occurs in only the motor 13 or the parking mechanism 51. However, when the abnormality is detected in both the shift determination unit 111 and the motor control unit 121, it is difficult to specify whether the motor control unit 121 is abnormal, or the motor 13 or the parking mechanism 51 is abnormal.

Therefore, in step S60, the signal representing the abnormality data cancel request (cancel request) is output to the shift determination unit 111. That is, the abnormality check unit 122 outputs the abnormality data cancel request to the shift determination unit 111. As described above, when the abnormality data cancel request is received, the shift determination unit 111 does not store the first diagnosis information even when the abnormality is detected. That is, as shown in FIG. 3A, when the abnormality data cancel request is received, the shift determination unit 111 regards that there is no abnormality even if the abnormality is detected.

Thus, when the abnormality occurs in only the motor 13 and the parking mechanism 51, it is possible to prevent the first diagnosis information from being stored in the data memory unit 113 even if the abnormality is detected in the shift determination unit 111. That is, it is possible to detect the abnormality occurring in only the motor control unit 121 and to allow the second diagnosis information to be stored in only the data memory unit 123. Thus, when the abnormality occurs in only the motor 13 and the parking mechanism 51, it is possible to specify the abnormal location easily. In this way, since the abnormal location can be specified easily, when the abnormality occurs in only the motor 13 and the parking mechanism 51, it is possible to prevent the motor ECU 12 including the motor control unit 121 from being erroneously replaced together with the motor 13 and the parking mechanism 51.

As described above, the SBW system 10 is configured to detect the abnormality in the system (abnormality of the motor control unit 121, or the motor 13 or the parking mechanism 51). Specifically, the motor control unit 121 detects whether a mechanical abnormality is present in the motor 13 or the parking mechanism 51, and the shift determination unit 111 detects whether an abnormality occurs in the motor control unit 121.

In the embodiment, the HV ECU 11 and the motor ECU 12 are employed as the first and the second electronic controllers, respectively. However, two microcomputers (for example, a main microcomputer and a sub-microcomputer) included in the same ECU may be employed as the first and the second electronic controllers, respectively. That is, a microcomputer (first electronic controller) including the shift determination unit 111 and the data memory unit 113 and a microcomputer (second electronic controller) including the motor control unit 121, the abnormality check unit 122, and the data memory unit 123 may be included in the same ECU.

In the embodiment, the shift-by-wire system is applied to and in-vehicle control system in the hybrid vehicle. However, the shift-by-wire system can be applied to an in-vehicle control system of a vehicle having only an engine or an electric motor. In this case, for example, a shift-by-wire system 10 may be configured as another embodiment as shown in FIG. 7, in which the same structural components as those of the embodiment described above will be denoted by the same reference numerals.

Figure 7:
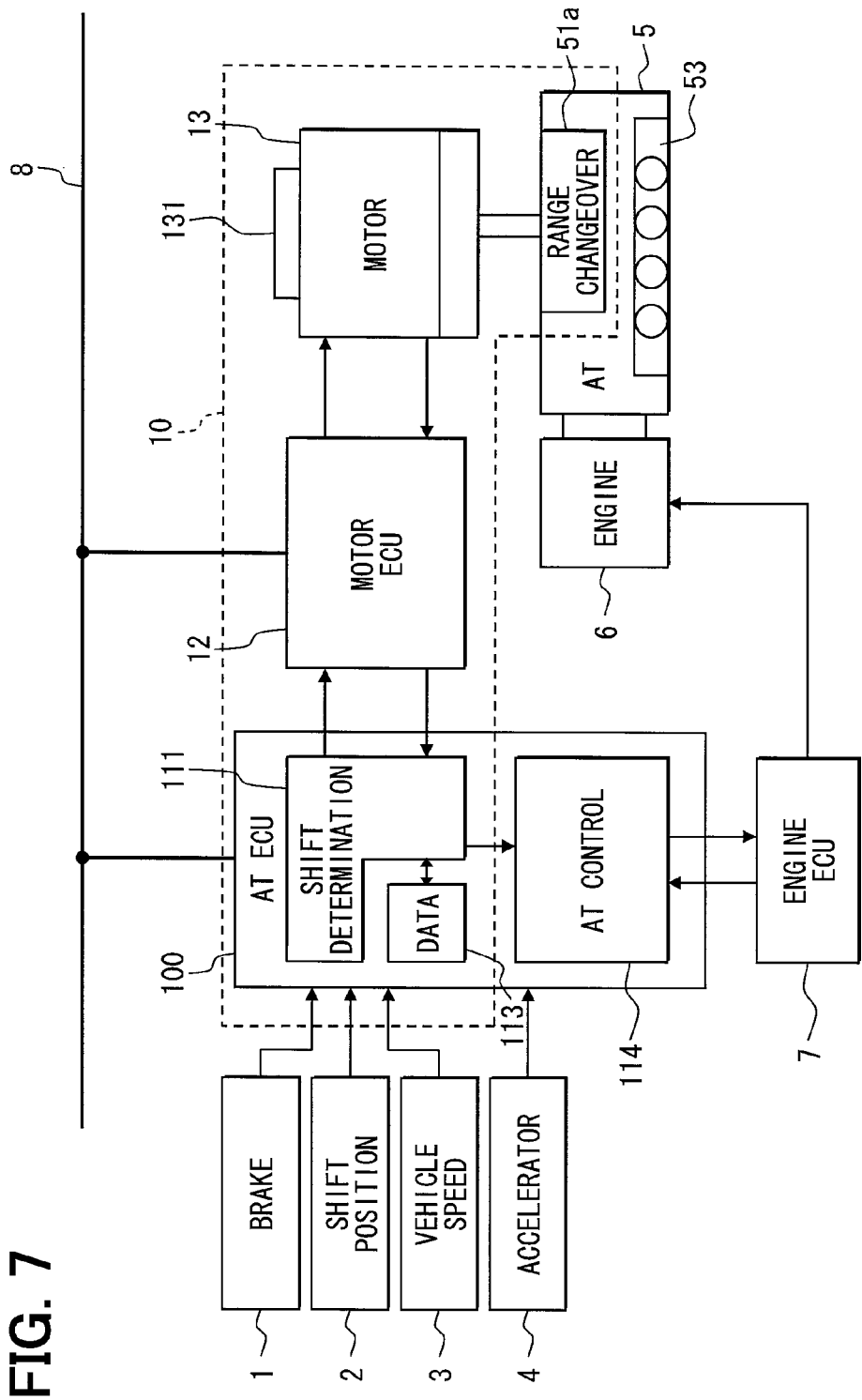
FIG. 7 is a block diagram showing schematically an in-vehicle control system including a shift-by-wire system according to another embodiment.

In the embodiment shown in FIG. 7, the shift determination unit 111 is included in an AT ECU (automatic transmission ECU) 100. Moreover, an AT control unit 114 is included in the AT ECU 100 in place of the HV control unit 112. Furthermore, in the transaxle 5, an electronic valve device 53 is included in place of the motor-generator 52, and a range changeover mechanism (changeover mechanism) 51*a* is included in place of the parking mechanism 51. The range changeover mechanism 51*a* may include a conventional one.

In the embodiment shown in FIGS. 1 to 6, the range of the parking mechanism 51 is changed to the target range selected by the driver (for example, from the P-range to the non-P-range or from the non-P-range to the P-range) by controlling the driving of the motor 13 based on the signal corresponding to the range changeover operation of the driver. In the embodiment shown in FIG. 7, the range of the range changeover mechanism 51*a* is changed to the target range selected by the driver (for example, each of the P-range, the N-range, the R-range, and the D-range) by controlling the driving of the motor 13 based on a signal corresponding to the range changeover operation of the driver.

The above-described embodiments may further be modified.

What is claimed is:

1. A shift-by-wire system comprising:
a first electronic controller including a shift determination unit that determines a range changeover operation for a target range of a transmission selected by a driver and outputs a range changeover request for the target range; and
a second electronic controller including a motor control unit that controls driving of a motor in accordance with the range changeover request of the shift determination unit to drive a changeover mechanism that changes a range of the transmission to change the range to the target range,
wherein the motor control unit is configured to acquire a signal representing a state of the changeover mechanism and detect an abnormality when a detected state of the changeover mechanism indicates that the changeover mechanism does not attain the target range after motor driving control is started,
wherein the shift determination unit is configured to detect an abnormality when the detected state of the changeover mechanism acquired from the motor control unit indicates that the changeover mechanism does not attain the target range after the range changeover request is output,
wherein the first electronic controller includes a first memory unit that stores first diagnosis information for diagnosing the abnormality including a state of the first electronic controller when the shift determination unit detects the abnormality, and
wherein the second electronic controller includes
a second memory unit configured to store second diagnosis information for diagnosing the abnormality including a state of the second electronic controller when the motor control unit detects the abnormality, and
an abnormality check unit configured to compare the state of the changeover mechanism outputted to the shift determination unit by the motor control unit with the target range, and store the second diagnosis information in the second memory unit when the changeover mechanism does not attain the target range after the state of the changeover mechanism is outputted and the motor control unit does not detect the abnormality.

2. The shift-by-wire system according to claim 1, wherein abnormality check unit is configured to output a cancel request to the shift determination unit thereby to cancel storing of the first diagnosis information in the first memory unit when the changeover mechanism does not attain the target range within the predetermined period after the state of the changeover mechanism is outputted and the motor control unit detects the abnormality.

3. The shift-by-wire system according to claim 1, wherein each of the first memory unit and the second memory unit includes a nonvolatile memory device.

4. The shift-by-wire system according to claim 1, wherein the motor control unit is configured to detect the abnormality only after a predetermined period from starting of the motor driving control,
wherein the shift control unit is configured to detect the abnormality only after a predetermined period from outputting of the range changeover request, and
wherein the abnormality check unit is configured to store the second diagnosis information in the second memory unit when the changeover mechanism does not attain the target range within a predetermined period after the state of the changeover mechanism is outputted and the motor control unit does not detect the abnormality.

* * * * *